United States Patent [19]

Kimura et al.

[11] Patent Number: 4,520,965
[45] Date of Patent: Jun. 4, 1985

[54] APPARATUS FOR WINDING COILS IN ELECTRIC MACHINERY

[75] Inventors: Kazuo Kimura; Yukinori Taneda; Shinichi Tsuyuki, all of Yokohama; Shun Suzuki; Yoshio Hashimoto, both of Katsuta; Shinichi Sakamoto, Hitachi, all of Japan

[73] Assignee: Hitachi Koki Company, Limited, Tokyo, Japan

[21] Appl. No.: 520,196

[22] Filed: Aug. 4, 1983

[30] Foreign Application Priority Data

Aug. 7, 1982 [JP] Japan .................................. 57-137559
Aug. 18, 1982 [JP] Japan .................................. 57-143819

[51] Int. Cl.³ ............................................ H02K 15/09
[52] U.S. Cl. ................................. 242/7.05 B; 29/598
[58] Field of Search .................... 242/7.05 B, 7.05 C, 242/7.05 A, 7.05 R; 29/598

[56] References Cited

U.S. PATENT DOCUMENTS

| 3,098,616 | 7/1963 | Eminger | 242/7.05 B |
| 3,506,864 | 4/1970 | Miller | 242/7.05 B |
| 3,713,598 | 1/1973 | Bucholtz et al. | 29/598 X |
| 3,927,456 | 12/1975 | Dammar | 29/598 X |
| 3,973,738 | 8/1976 | Miller | 242/7.05 B |
| 4,174,815 | 11/1979 | Dammar | 242/7.03 X |

FOREIGN PATENT DOCUMENTS

52-76601  6/1977  Japan .............................. 242/7.05 B

*Primary Examiner*—Stuart S. Levy
*Assistant Examiner*—Joseph J. Hail, III
*Attorney, Agent, or Firm*—Cushman, Darby & Cushman

[57] ABSTRACT

An electric wire is wound as coil turns in slots in electric rotating machinery component such as a stator or an armature. The wire as it is supplied from a nozzle or flyer is guided by movable formers into successive layers of coil turns in the slots without forming an unwanted dead space in the slots. The formers are moved in radial increments to provide successive spaces in the slots for allowing the successive coil turn layers to be neatly laid in the spaces.

1 Claim, 10 Drawing Figures

APPARATUS FOR WINDING COILS IN ELECTRIC MACHINERY

BACKGROUND OF THE INVENTION

The present invention relates to an apparatus for winding coils in slots in electric machinery components such as stators and armatures.

Prior apparatus for winding coils in stators comprise a movable nozzle having a needle for supplying an electric wire into slots in the stator. The nozzle is movable back and forth along the slots and swingable reciprocally for continuously laying the wire as coil turns in the slots to thereby form successively coils in the slots. The coil turns as they are inserted in the slots are freely movable within the slots and thus tend to be displaced into mutually crossing relation, creating "dead spaces" in the slots. Although the coil winding apparatus can wind coils directly in the stator at a higher rate than coils are performed and then inserted in stator slots, the stator slots suffer from the large dead spaces which reduce the space factor of the stator coils, resulting in poor performance of the rotating machinery.

There is known a flyer coil winder for winding coils on the armature of a motor. The flyer coil winder includes a flyer affixed to a spindle and rotatable for continuously supplying an electric wire, and a chuck mounted by a bearing on the spindle and providing a former extending longitudinally of an armature on which coils are to be wound. The wire is wound by the flyer along the former into coils inserted in slots defined in the outer peripheral surface of the armature. Another known coil winding apparatus designed for winding coils on small-size motors has a pair of flyers rotatable in spaced orbits in opposite directions about a common axis extending perpendicularly to the axis of the motor armature. The coils as they are formed by the flyers are guided by formers into the slots in the armatures.

The formers in these known flyer coil winders are fixed to chucks and spaced sufficiently from the armature so as not to interfere with finally placed coils when the armature is indexed so that all of the coils can be wound in place. Since the formers can guide the wire only up to entrances of the slots, the coils placed in the slots are loosened and freely movable therein. The wire as inserted in the slot tends to be positioned closely to one slot wall, is wound into a few coil turns up the slot wall, and then the coil turns are collapsed in the slot. The coil turns therefore cross each other and are loosened in the slot, thus adversely affecting any successive coil turns inserted in the slot and producing a dead space therein. When the coil is wound up, it closes the entrances of adjacent slots and prevents coils from being inserted in the adjacent slots, and coil ends interfere with each other and swell at the exits of the slots. This increases the space factor of the coils in the slots to the point where no wedge can be inserted in the slots.

The conventional coil winders therefore fail to prevent the successively wound-up coil turns, the crossing of the turns, the dead space, and the interference of the coil ends. Accordingly, no coil winders have been available for winding coils neatly in armature slots with a high space factor of the coils in the slots. The space factor of the coils in the armature coils has been up to about 57% for thick electric wires and about 60% for thin electric wires. To construct small-size and high-output motors, it is the best way to increase the space factor of the coils in the slots as it does not largely affect the temperature rise of the motor and the useful life of the brush.

SUMMARY OF THE INVENTION

It is an object of the present invention to provide an apparatus for winding coils in electric machinery, the apparatus having movable formers for successively inserting coil turns neatly in slots at an increased space factor.

According to the present invention, a plurality of movable formers guide an electric wire as supplied from a nozzle or flyer so as to be neatly inserted as a layer of coil turns in a slot in an electric machinery component such as a stator or armature. The formers are radially moved in increments to provide successive spaces in the slots for accommodating successive layers of coil turns neatly laid in the spaces without producing undesirable dead spaces in the slots.

BRIEF DESCRIPTION OF THE DRAWINGS

The present invention will be described in detail by way of illustrative example with reference to the accompanying drawings, in which.

DETAILED DESCRIPTION

Figure 1:
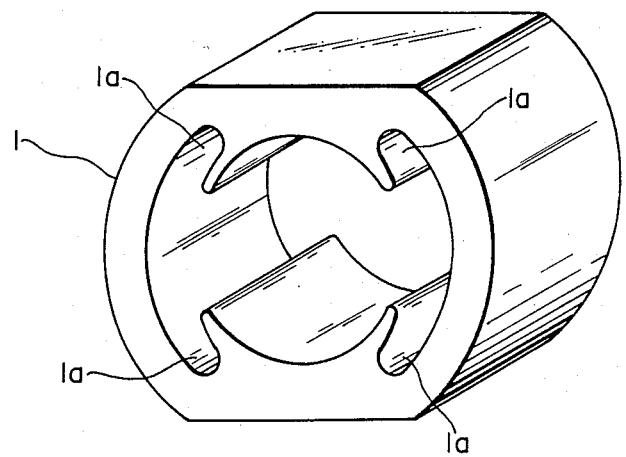
FIG. 1 is a perspective view of a stator having slots.
Figure 2:
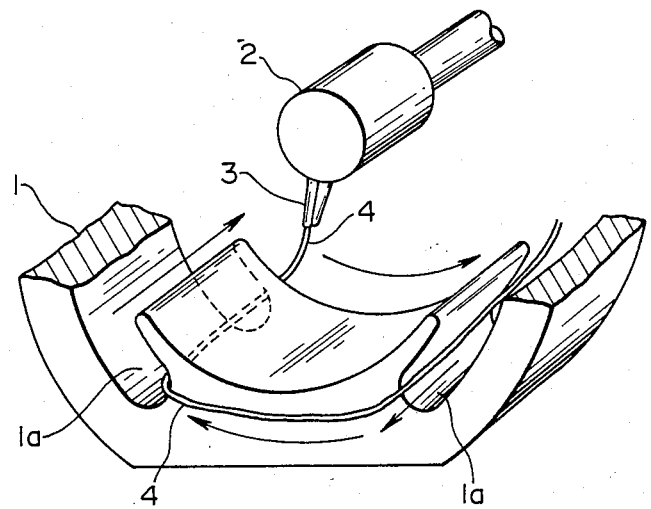
FIG. 2 is a fragmentary perspective view of the stator shown in FIG. 1, illustrative of the principles of winding coils in the slots.

FIG. 1 shows a stator 1 of an electric rotating machine such as an induction motor. The stator 1 has a plurality of axial slots 1a spaced radially from each other for insertion of coils therein. FIG. 2 illustrates the principles of winding coils in the slots 1a in the stator 1. A nozzle 2 has a needle 3 on its distal end and is movable back and forth and swingable reciprocably for successively supplying an electric wire 4 through the needle 3. The needle 3 is moved in the directions of the arrows for placing coil turns in an opposite pair of slots 1a to form a stator coil.

Since the inserted coil turns are freely movable in the slots 1a, they tend to cross each other therein producing dead spaces in the slots 1a.

Figure 3:
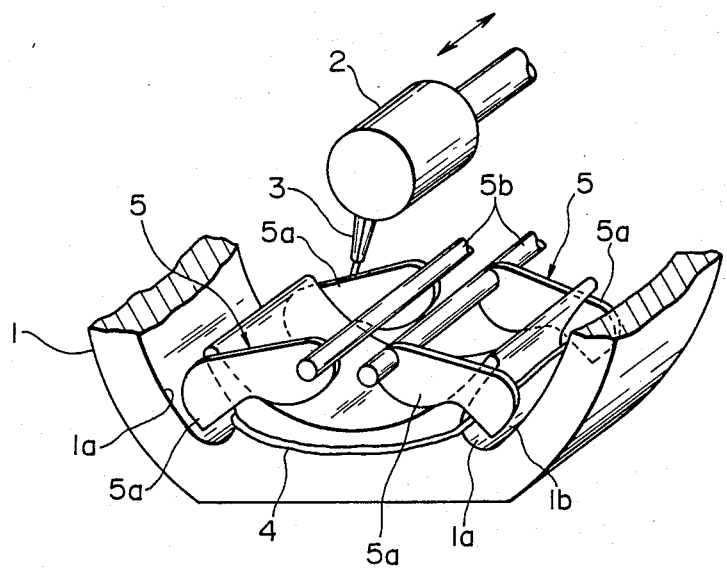
FIG. 3 is a fragmentary perspective view of an apparatus for winding coils in a stator according to an embodiment of the present invention.
Figure 4:
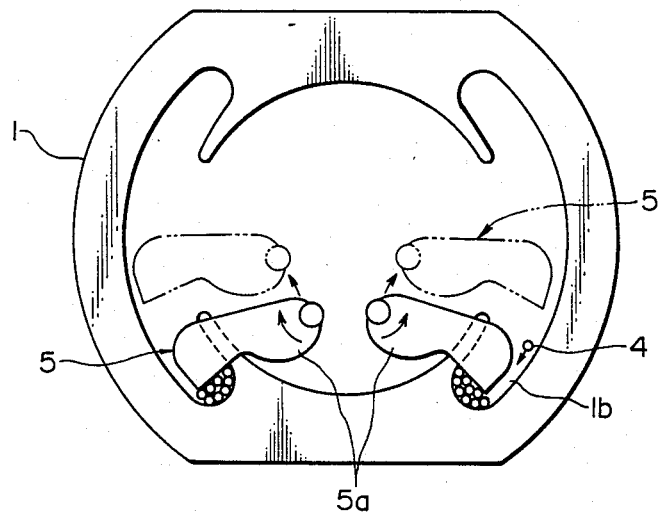
FIG. 4 is a front elevational view of the apparatus shown in FIG. 3.

According to the present invention, as shown in FIGS. 3 and 4, a former 5 is swingably disposed in the stator 1 for each slot 1a. The former 5 is composed of a pair of axially spaced guide members 5a, 5a positioned at axial ends of the stator 1 and interconnected by a shaft 5b extending axially of the stator 1. Each of the guide members 5a, 5a has a radially outward edge spaced a distance 1b from an outer wall surface of a corresponding one of the slots 1a. The former 5 is movable in increments from the bottom of the slot 1a (shown by the solid lines in FIG. 4) to the open end of the slot 1a (shown by the imaginary lines in FIG. 4). When coils are to be wound in the stator 1, the formers 5 are positioned such that lower straight edges of the guide members 5a are spaced from the slot bottoms by a distance slightly greater than the diameter of the electric wire 4. As the nozzle 2 moves axially and angularly, the electric wire 4 drawn off from the needle 3 is guided by the guide member 5a to enter the slot 1a through the gap 1b. Since the electric wire 4 is subjected to a radially inward force in the slot 1a during movement of the nozzle 2, the electric wire 4 is displaced from a radially outward position to a radially inward position in the slot 1a and positioned as a coil turn in the slot 1a by being guided by the bottom of the slot 1a and the lower edges of the guide members 5a. When the space between the slot bottom and the lower guide member edges is filled up with successively laid coil turns, the former 5 is angularly lifted in the directions of the arrows (FIG. 4) to provide an additional space in the slot 1a for another layer of coil turns above the next preceding coil turn layer which has already been inserted. Then the nozzle 2 is operated to place successive coil turns into the additional space. The foregoing cycle of operation is repeated until a desired coil is wound in the paired stator slots 1a. The coil turns as they are laid in the slots are neatly arranged at a high density without mutual crossing. The space factor of the coils in the stator slots is therefore increased, and the motor thus constructed has improved performance.

Figure 5:
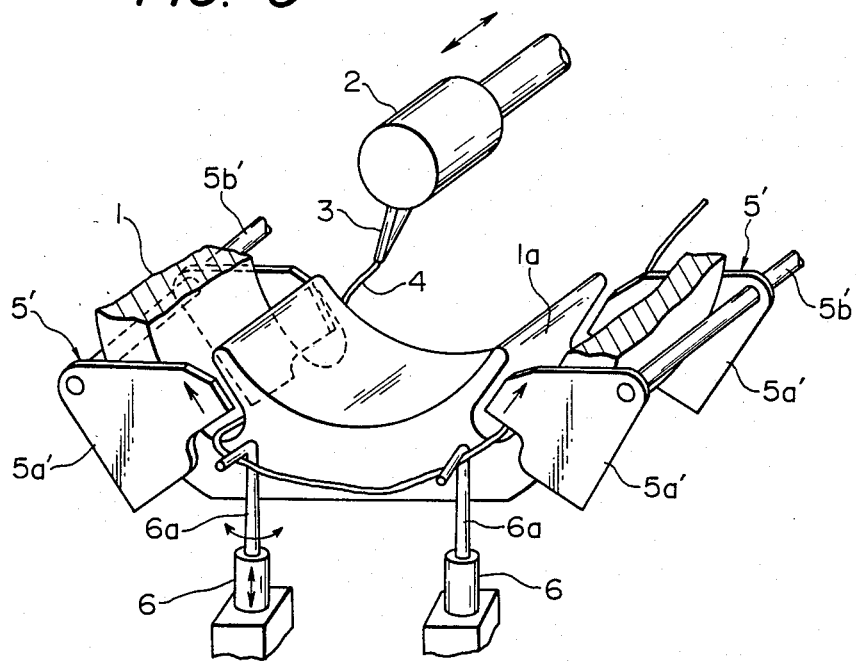
FIG. 5 is a fragmentary perspective view of an apparatus for winding coils in a stator according to another embodiment of the present invention.
Figure 6:
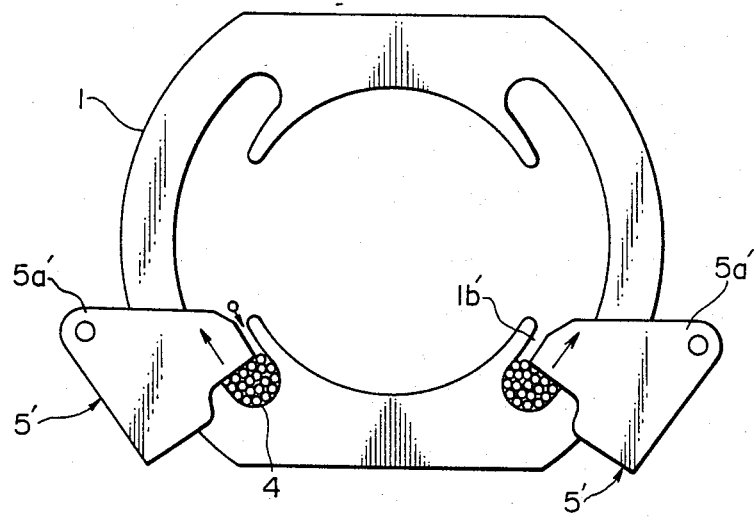
FIG. 6 is a front elevational view of the apparatus shown in FIG. 5.

FIGS. 5 and 6 illustrate a coil winding apparatus according to another embodiment of the present invention. The coil winding apparatus includes a pair of formers 5', 5' disposed in the stator 1 respectively for the paired stator slots 1a and a pair of fingers 6, 6 for supporting and guiding an electric wire 4 supplied from the nozzle 2. Each of the formers 5' has a pair of guide members 5a', 5a' positioned respectively at axial ends of the stator 1 and having radially inward edges spaced a distance 1b' from radially inward wall surfaces of the slots 1a. Each of the fingers 6 has a hooked rod 6a which is vertically movable and angularly movable about its own axis in the directions of the arrows shown in FIG. 5. The arrangement of FIGS. 5 and 6 is particularly advantageous in applications requiring the wire 4 to be inserted into the slot 1a successively from a radially inward side thereof toward a radially outward side thereof. During operation of the apparatus, each coil turn inserted in the slot 1a is not subjected to a natural force directed radially outwardly of the stator 1. The inserted coil turn is forcibly displaced by the hooked rods 6a of the fingers 6 radially outwardly in the spaces defined between the bottoms of the slots 1a and lower edges of the guide members 5a'. After a lowermost layer of successive coil turns has been laid in the slots 1a, the formers 5' are raised to provide an additional space for accommodating another layer of successive coil turns.

Figure 7:
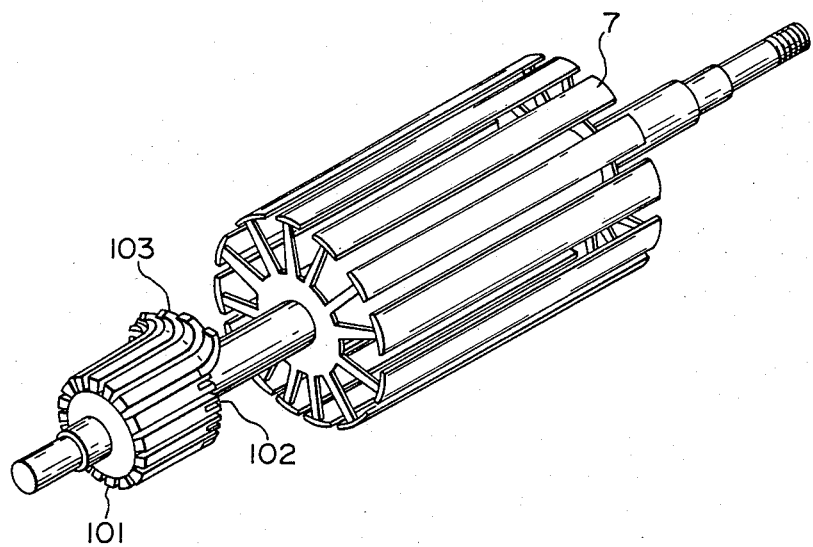
FIG. 7 is a perspective view of an armature having slots.

FIG. 7 shows a slotted armature 7 on which coils are to be wound, the armature 7 being designed for use in an electric rotating machine such as a motor or a generator, for example.

Figure 8:
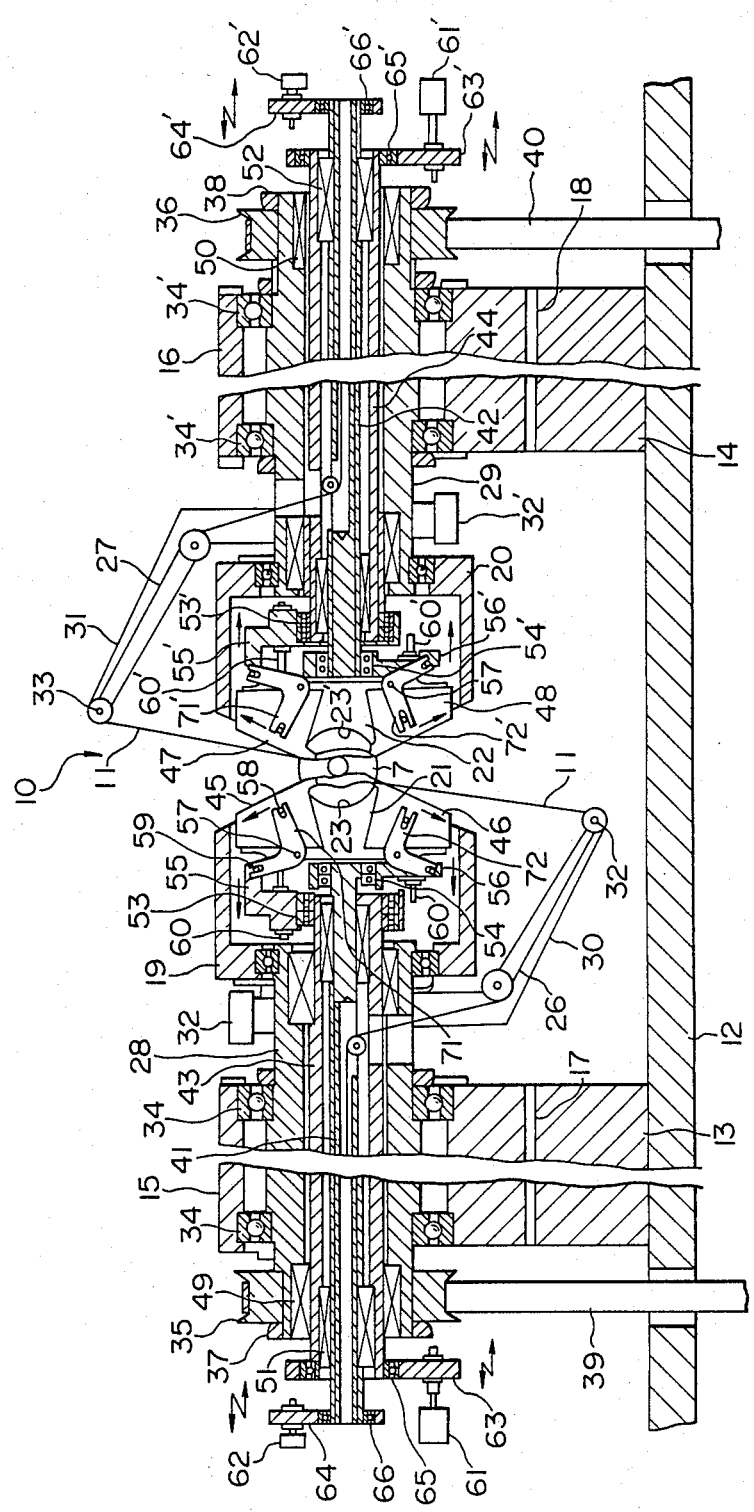
FIG. 8 is a fragmentary longitudinal cross-sectional view of an apparatus for winding coils on the armature according to still another embodiment of the present invention.

FIG. 8 illustrates an apparatus, generally designated at 10, for winding electric wires 11 as coils on the armature 7. The apparatus 10 is supported by a pair of spaced supports 13, 14 on a horizontal table 12. The apparatus 10 comprises a pair of spaced housings 15, 16 mounted respectively by a pair of horizontal slides 17, 18 on the supports 13, 14, respectively. The housings 15, 16 can be moved horizontally toward and away from each other by moving the horizontal slides 17, 18 with suitable means (not shown) such as pneumatic cylinders or DC motors through ball screws.

The armature 7 is mounted on an index mechanism (not shown) fixed to the horizontal table 12 and can be angularly moved or indexed thereby to bring different pairs of slots into alignment with coil winding positions.

Figure 9:
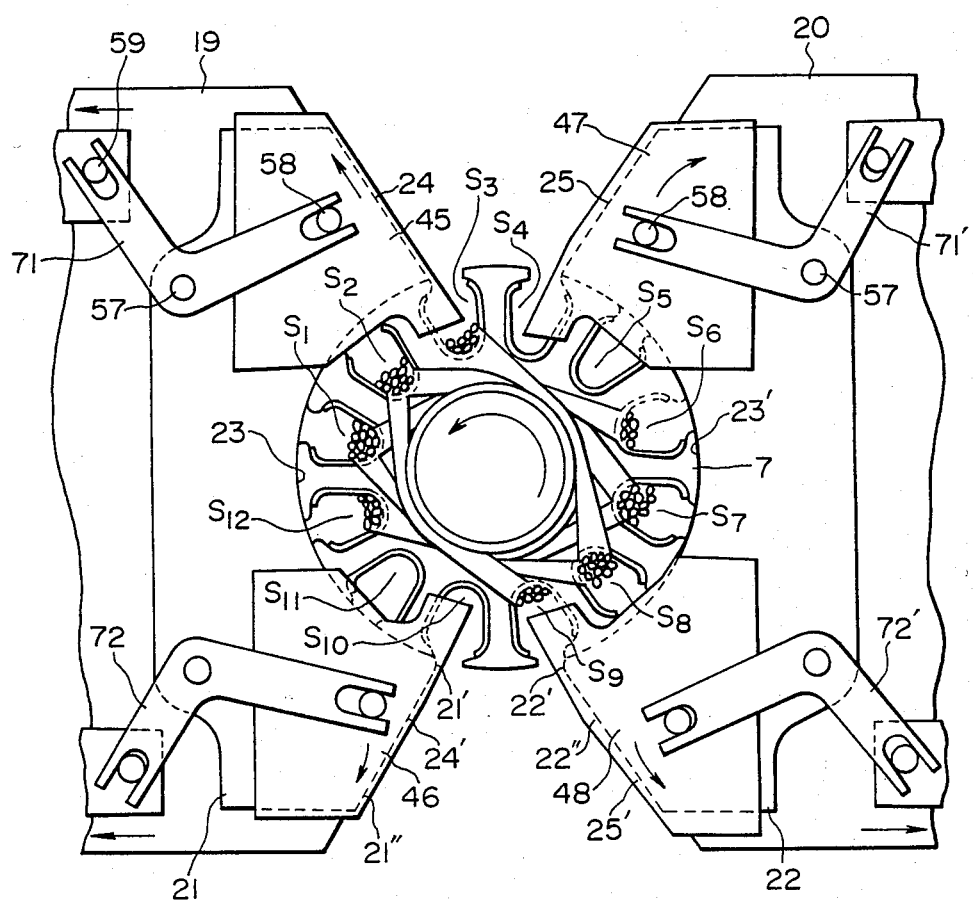
FIG. 9 is a fragmentary enlarged front elevational view showing the manner in which coils are wound in the slots in the armature with a plurality of movable formers.

A pair of former housings 19, 20 is mounted in confronting relation by bearings on ends of hollow coaxial shafts 28, 29 rotatably supported by bearings 34, 34' in the housings 15, 16, respectively. The housings 19, 20 accommodates therein a pair of chucks 21, 22, respectively, and two pairs of movable formers 45, 46 and 47, 48 which are positioned alongside of the armature 7 as supported by the index mechanism. As illustrated in FIG. 9, the chucks 21, 22 have ends 21', 22', respectively, and slanted surfaces 21'', 22'', respectively, which define fixed formers 24, 24', 25, 25', respectively, extending along longitudinally of the outer peripheral surface of the armature 7. The chucks 21, 22 also have partly cylindrical recessed surfaces 23, 23', respectively, shaped in complementary relation to the cylindrical surface of the armature 7. In operation, the armature 7 is fitted in the recessed surfaces 23, 23' and securely positioned thereby while covering all of the slots in the armature 7 except for those which are exposed to receive coils.

The apparatus includes a pair of flyers 26, 27 fixed to the shafts 28, 29, respectively, behind the housings 19, 20 and driven by the shafts 28, 29 for winding the wires 6, 6 as coils on the armature 7.

The flyers 26, 27 are composed of arms 30, 31, respectively, having guide rollers 32, 33 mounted on distal ends of the arms 30, 31 for guiding the wires 6, 6 when they are wound on the armature 7. To the arms 30, 31, there are attached counterweights 32, 32' for allowing the flyers 26, 27 to rotate in a state of balance.

The shafts 28, 29 support on their outer ends a pair of pulleys 35, 36, respectively, retained in place by nuts 37, 38 for rotation in unison with the shafts 28, 29. A pair of belts 39, 40 is trained around the pulleys 35, 36, respectively, and driven by a single motor (not shown) disposed below the horizontal table 12.

Two coaxial splined shafts 41, 43 which are interfitted are mounted by bearings 49, 51 in the shaft 28, and likewise two coaxial splined shafts 42, 44 which are interfitted are mounted by bearings 50, 52 in the shaft 29. The splined shafts 41, 43 are connected by bearings 66, 65 to shaft displacer plates 63, 64, respectively, coupled by ball screws to the shafts of motors 61, 62, respectively. Similarly, the splined shafts 42, 44 are connected by bearings 66', 65' to shaft displacer plates 63', 64', respectively, coupled by ball screws to the shafts of motors 61', 62', respectively. Therefore, the splined shafts are independently movable back and forth in the axial directions by these motors.

The inner splined shafts 41, 42 have axial holes for supplying the wires 6 therethrough to the flyers 26, 27. The inner and outer splined shafts 41, 43 and 42, 44 have aligned radial holes, and the shafts 28, 29 have radial holes held in registry with the radial holes in the inner and outer splined shafts for supplying the wires 6 to the flyers 26, 27.

The splined shafts 41, 43 support slide blocks 56, 55 mounted on the ends adjacent to the chuck 21 through bearings 54, 53, respectively, for turning L-shaped former drive arms 71, 72, respectively. Likewise, the splined shafts 42, 44 support slide blocks 56', 55' mounted on the ends adjacent to the chuck 22 through bearings 54', 53', respectively, for turning L-shaped former drive arms 71', 72', respectively. The slide blocks 55, 56, 55', 56' are axially slidable while being guided by rotation prevention guide bars 60, 60' fixed to the housings 19, 20, respectively. Pins 59 are secured to the slide blocks 55, 55', 56, 56' and engages in slots defined in one ends of the former drive arms 71, 71', 72, 72' for turning the latter in response to axial movement of the slide blocks 55, 55', 56, 56'. The former drive arms 71, 71', 72, 72' have pivot pins attached to the chucks 21, 22 and are held in engagement at the other ends thereof with pins 58 fixed to the formers 45, 46, 47, 48. Thus, the formers 45, 46, 47, 48 are movable radially outwardly and inwardly of the armature 7 in response to axial movement of the slide blocks 55, 55', 56, 56'.

Figure 10:
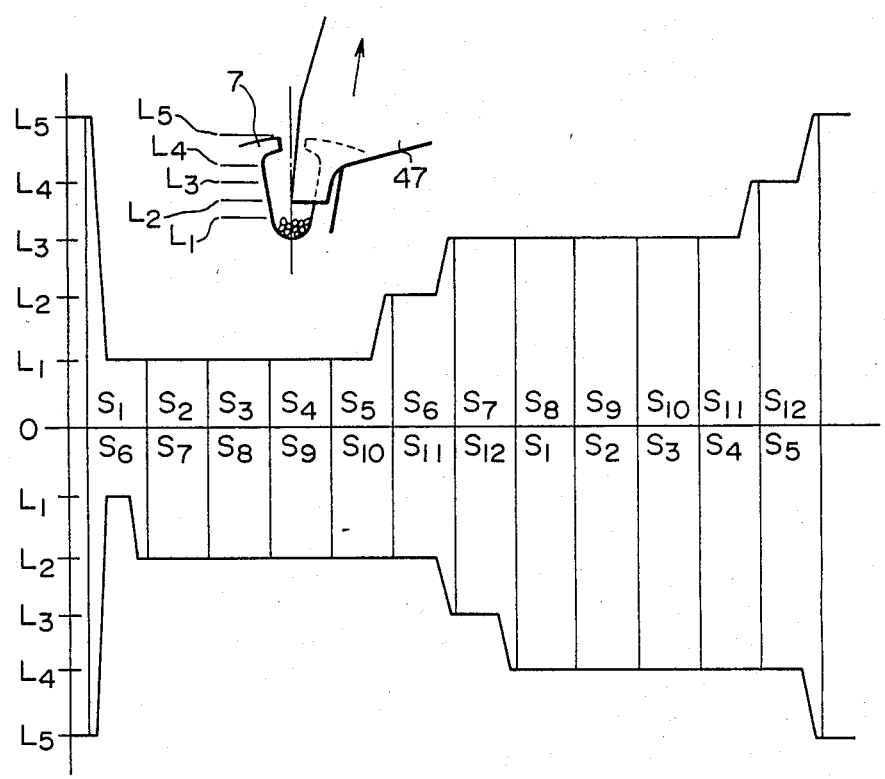
FIG. 10 is a graph showing the relationship between the sequence of winding of coils in the slots and the successive levels in which the movable formers are positioned during a coil winding operation.

Operation of the apparatus shown in FIGS. 8 and 9 will be described with reference to FIG. 10. For winding first coils in slots S1, S6 and S7, S12, for example, the armature 7 is indexed to bring these slots in the exposed position as shown in FIG. 9 and then fixed in position by the chucks 21, 22, whereupon the fixed formers are set in position. The motors 61, 62, 61', 62' are driven to cause the shaft displacer plates 63, 64, 63', 64', the bearings 66, 66, 65', 66', the splined shafts 43, 41, 44, 42, the bearings 53, 54, 53', 54', the slide blocks 55, 56, 55', 56', and the former drive arms 71, 72, 71', 72' to move the movable formers 45, 46, 47, 48 radially from a retracted level L5 to a winding start level L1. When the movable formers are thus to be set in position, the wires 6 have distal ends secured in slits 102 or to hooks 103 (FIG. 7) of a commutator 101 of the armature 7. After the movable formers have been positioned, the flyers 26, 27 are driven to revolve for inserting a predetermined number of coil turns successively into spaces defined between the movable formers 45, 46, 47, 48 and the bottoms of the slots S1, S6, S7, S12. At this time, the wires 6 as they are inserted as coil turns are guided by the fixed formers 24, 24', 25, 25' and the movable formers 45, 46, 47, 48. The inserted coil turns are neatly placed as layers in these slots without piling-up or mutual crossing. When the cycle of winding operation is completed, the flyers 26, 27 are stopped, and the final ends and next starting ends of the wires 6 are connected to the commutator 101.

When a next layer of coil turns is to be placed in the slots S2, S7 and S1, S8, the armature 7 is required to be indexed counterclockwise as shown in FIG. 9. Since each of the slots S7, S1 has contained one layer of coil turns, the ends of the coil turns in the slots S7, S1 would interfere with the movable formers 48, 45 if these movable formers remained in the level 1. Therefore, the movable formers 48, 45 should be lifted to a winding level L2 prior to the indexing of the armature 7. Then, the chucks 21, 22 are retracted to release the armature 7, and the armature 7 is indexed. Coil turns are then inserted into the slots S2, S7 and S1, S8. The coil turns are placed as a first layer in each of the slots S2, S8, and as a second layer in each of the slots S1, S7, in which the additional coil turns are guided successively into a space defined between the previously laid layer and the movable former 45, 48.

With the arrangement of the present invention, coil turns are neatly wound in slots without the problems of being piled up, crossing each other, producing unwanted dead spaces, and causing coil ends to interfere with each other. The space factor of the coils in the slots can be increased up to about 70% which is about 20% greater than space factors available with conventional apparatus.

The motors having windings produced by the apparatus of the invention are capable of generating a higher output and have various improved aspects of performance, such as a reduced temperature rise during operation, a prolonged service life of the brushes, and a small motor size.

Although certain preferred embodiments of the present invention have been shown and described in detail, it should be understood that various changes and modifications may be made therein without departing from the scope of the appended claims.

What is claimed is:

1. An apparatus for winding coils on an electric machinery component having axial slots, comprising:
    means for continuously supplying a wire as coil turns into a selected pair of the slots; and
    means for guiding the supplied coil turns as a layer in the paired slots, said guiding means being movable in incremental steps in a direction toward open ends of the slots for laying successive layers of coil turns in the slots,
    wherein said guiding means comprises a plurality of fixed formers adapted to be positioned peripherally around the armature for guiding the wires into the slots, and a plurality of movable formers adapted to be positioned at axial ends of the armature for guiding the coil turns to be inserted as the layer in the slots,
    wherein said supplying means comprises a table, a pair of rotatable shafts supported on said table, and a pair of flyers mounted on said shafts, respectively, for corotation, and having guide rollers for guiding wires, respectively, said guide means comprising a plurality of splined shafts rotatably and axially movably supported in said rotatable shafts, slide blocks mounted respectively on ends of said splined shafts, respectively, a pair of housings rotatably mounted on ends of said rotatable shafts, a pair of chucks mounted in said housings, respectively, for supporting the armature therebetween, said chucks defining said fixed formers, said movable formers being movably supported on said chucks, and a plurality of former drive arms pivotably mounted on said chucks and pivotably engaging said slide blocks and said movable formers for causing said movable formers to be radially outwardly displaced successively to define successive spaces between themselves and bottoms of the slots in response to axial movement of said splined shafts, whereby the coil turns can be inserted into said spaces as successive layers in the slots.

* * * * *